United States Patent
Kooy et al.

[15] 3,705,410
[45] Dec. 5, 1972

[54] AUTOMATED METHOD FOR OPTIMIZING UTILIZATION OF WAREHOUSE STORAGE SPACE

[72] Inventors: Elmer D. Kooy, Minnetonka; Donald L. Peterson, Burnsville, both of Minn.

[73] Assignee: The Pillsbury Company, Minneapolis, Minn.

[22] Filed: Jan. 21, 1971

[21] Appl. No.: 108,497

[52] U.S. Cl. ................................................ 444/1
[51] Int. Cl. ............................................. G06f 15/24
[58] Field of Search ........................... 235/150; 444/1

*Primary Examiner*—Eugene G. Gotz
*Assistant Examiner*—Edward J. Wise
*Attorney*—Ronald E. Lund, James V. Harmon and Michael D. Ellwein

[57] ABSTRACT

The program of the present invention deals with the following given information: the quantity of units produced in each production run, the number of units expected to be shipped out on a series of successive days, the size of each storage area (the base position occupied by one unit of product, e.g., a pallet), the number of product units (pallets) that can be stored on top of one another (stacking height), the minimum inventory desired (safety stock) and the minimum aisle width. This information is represented by a bit stream which is fed to a data processing system programmed in accordance with the invention. The program first determines the daily inventory on a series of successive days utilizing the above information. The program finds the number of storage bays required to be used on each of the aforesaid successive days assuming a bay depth of from 1 to 10 base positions. The program then selects the bay depth which uses the smallest total floor space. A summary is then made of the total number of bays required and the area at the minimum bay depth. This information is then used by an operator to lay out the warehouse and tells how much total space is required for a particular warehousing operation as well as the effect on storage space caused by changing production schedules or changes in any of the above factors.

7 Claims, 17 Drawing Figures

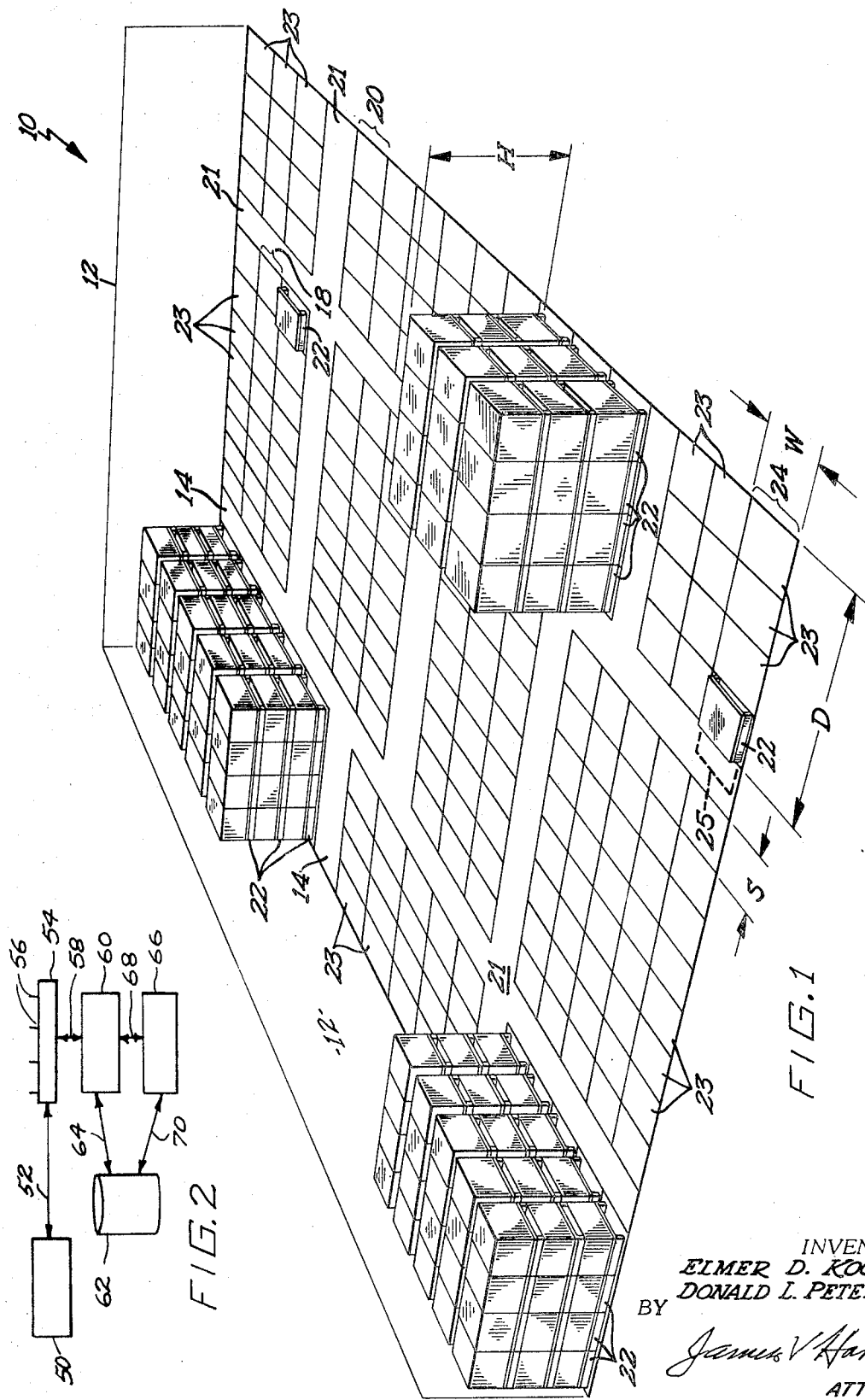

FIG. 3F

STATEMENT
NUMBER (M)

428  B (I2,3) = B (I2,3) + P5
     T5 = 100 * P5/ (F1*I2*T (I2,1))

436  RR : "YES"  = → GO TO SUBROUTINE 500
        ≠

440  PRINT A;P;S;N2;PP;P5;T5;T(I2,1);I2;T(I2,2)

448  ⎰ J = 0
     ⎱
        J = J + 1

B (I2,J) = B(I2,J) + T (I2,J)

≠
        J : 2
        =

452  MATRIX P = ZERO

MATRIX R = ZERO

MATRIX T = ZERO (N)

FIG. 3M

| Statement Number | |
|---|---|
| | (P) |
| 488 | PRINT B2; B3 |
| 492 | PRINT "PERCENT ULTILIZATION"; |
| 496 | B4 = 100 * B3/F3 |
| | PRINT B4 |
| 498 | STOP |
| | 500 PRINT SUBROUTINE |
| | RETURN |

FIG. 30

AUTOMATED METHOD FOR OPTIMIZING UTILIZATION OF WAREHOUSE STORAGE SPACE

FIELD OF THE INVENTION

The present invention relates to the computation of warehouse storage requirements and more particularly to the estimation of space requirements for a changing inventory of material in storage.

BACKGROUND OF THE INVENTION

In the Feb. 18, 1969 issue of *Distribution Warehouse Cost Digest*, Volume 4, Number 4, a computerized system is described for estimating warehouse space requirements. In this system the space requirements are computed under static conditions with regard to the quantity of products stored in the warehouse. The program performs a simple arithmetic calculation to determine the optimum bay size required for storing a given number of pallets. It has no provision for considering the rate of output, the amount of product planned to be on hand when the stock is replenished, i.e., the planned minimum inventory (safety stock) and other factors. The only factor considered in the prior art is the incoming quantity of pallets per shipment. For example, if nine pallets are being shipped, the resulting bays must be three deep assuming that the pallets can be stacked three high. Moreover, only one production run is considered in each calculation. Accordingly, under many circumstances, substantial inaccuracies can occur in the results obtained in accordance with the prior art.

OBJECTS OF THE INVENTION

It is a primary object of the invention to provide an improved program for determining optimum storage conditions having the following characteristics and advantages: (a) provision for rapidly and accurately finding the optimum bay depth required under dynamic input and output conditions with a given input quantity, output quantity, stacking height, safety stock, aisle width, pallet base size, (b) a provision for calculating bay depth assortments under dynamic input and output conditions for various products to make possible a selection of the optimum bay size for each, (c) a provision for finding the percent utilization of each storage area and (d) provision for finding the average inventory for each product.

SUMMARY OF THE INVENTION

Briefly, this invention concerns a data processing system for optimizing warehouse storage. The system includes logic circuitry, a memory and a routine or control for processing a bit stream composed of bits representing (a) production quantities of units produced in a selected time period, (b) expected shipping quantities, (c) an assumed bay depth, (d) stacking height, (e) safety stock period, and (f) base position area. The difference between (a) and (b) is determined for each of a series of successive time periods, e.g., one through thirty days. The number of units stored at the end of each time period is then compared with those in storage when the product was first shipped to establish the working storage cycle of period P in which the quantity of units in storage returns to its original value or close to its original value. The means employed for making the comparison will now be described.

The total number of units in storage in each consecutive time period is compared with the number in storage on the first shipment day and the minimum difference between the sum on each succeeding time period and the sum on the first day of shipment is maintained in the memory. Unless a zero difference is reached, at which time the working cycle is determined, the program will continue to find sums for a total of N time periods, e.g., 30 days before stopping. After the period P of the working cycle has been found, the total number of bays used during the cycle is divided by the number of time periods in the cycle to find the average number bays in use per time period which is then multiplied by the floor area for the particular bay depth and height assumed in the run to thereby obtain the average floor area used per time period. The program then steps through a series of production runs using different bay depths repeating the above-noted calculations for each different bay depth from 1 deep to N deep and then selects the bay using the least average floor area per time period.

A preferred data processing system and control employs a bit stream representing: (a) the number of units of goods received into storage per time period, (b) the number of units shipped out per time period, (c) the safety stock period, (d) the stacking height of the goods, (e) the size of the storage area (base area) for one unit of goods and (f) an assumed bay depth. The data processing system has a memory, means for reading an writing signals during operation of the memory, a logic circuit means, and a control system for directing the operations of said data processing system to perform operations with the bit stream. The control system comprises:

a. a means for recording the number of said units in storage during each time period prior to the safety stock period,
b. a means for adding and subtracting the number of units introduced and removed in each time period after the elapse of the safety stock period to establish the number of units in storage at the end of each time period,
c. a means for recording the difference between the number of units in storage at the end of each time period and the number in storage at the end of the safety stock period,
d. a means for maintaining a record of the time period when the difference obtained is at a minimum or zero to thereby establish a working cycle,
e. a means for multiplying the average number of bays utilized per time period within the cycle by the area of one bay to obtain the total floor area required,
f. a means for repeating the aforesaid operations for each bay depth that is to be examined, and
g. a means for selecting as the optimum bay depth that which corresponds with the minimum floor area.

DESCRIPTION OF THE DRAWINGS

FIG. 1 is a perspective view of a warehouse showing the bays, aisles and product storage in which the invention can be applied.

FIG. 2 is a schematic block diagram of an apparatus embodying the invention.

DESCRIPTION OF THE PREFERRED EMBODIMENT

Figure 3A:
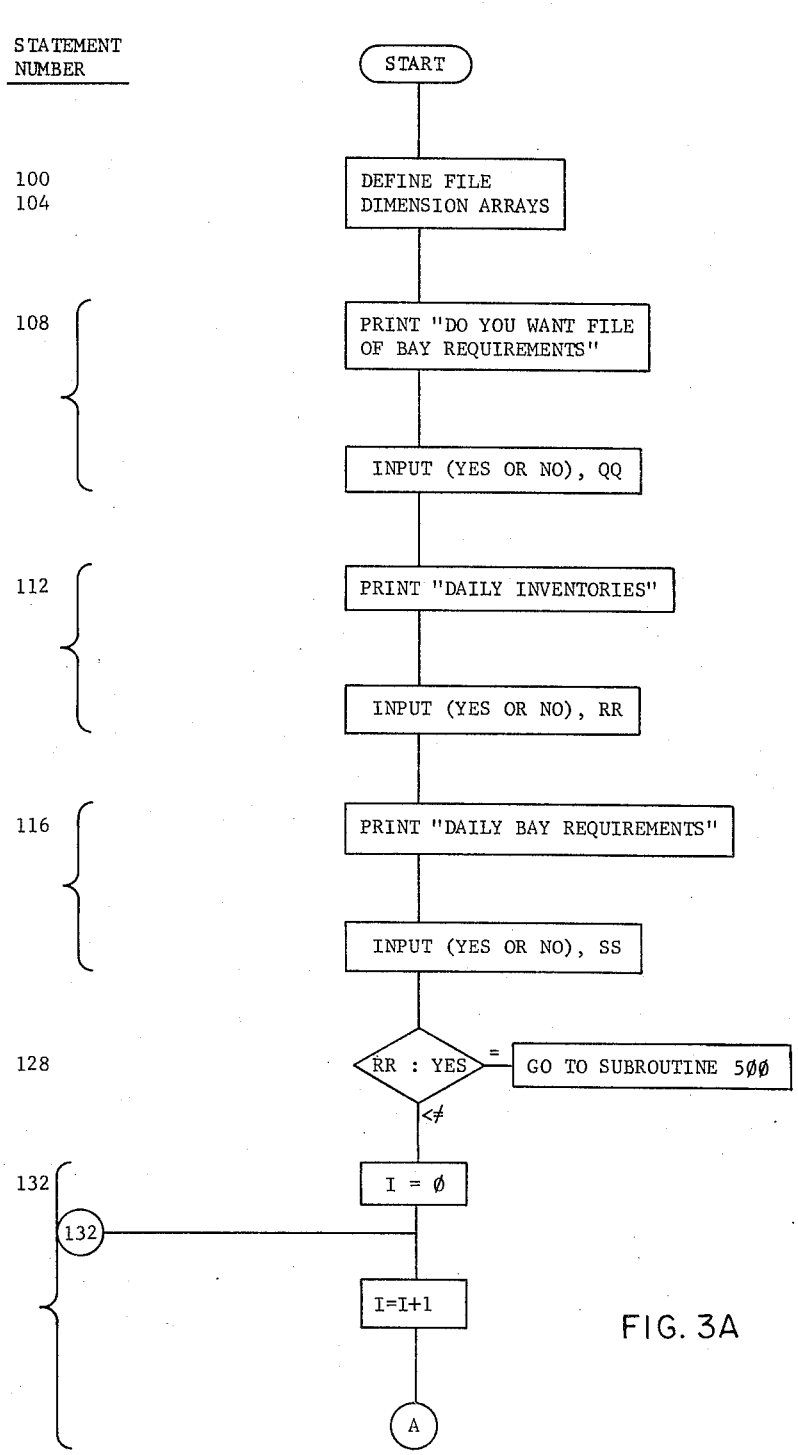
FIGS. 3A-3O is a schematic block diagram of an example of the invention.
Figure 3B:
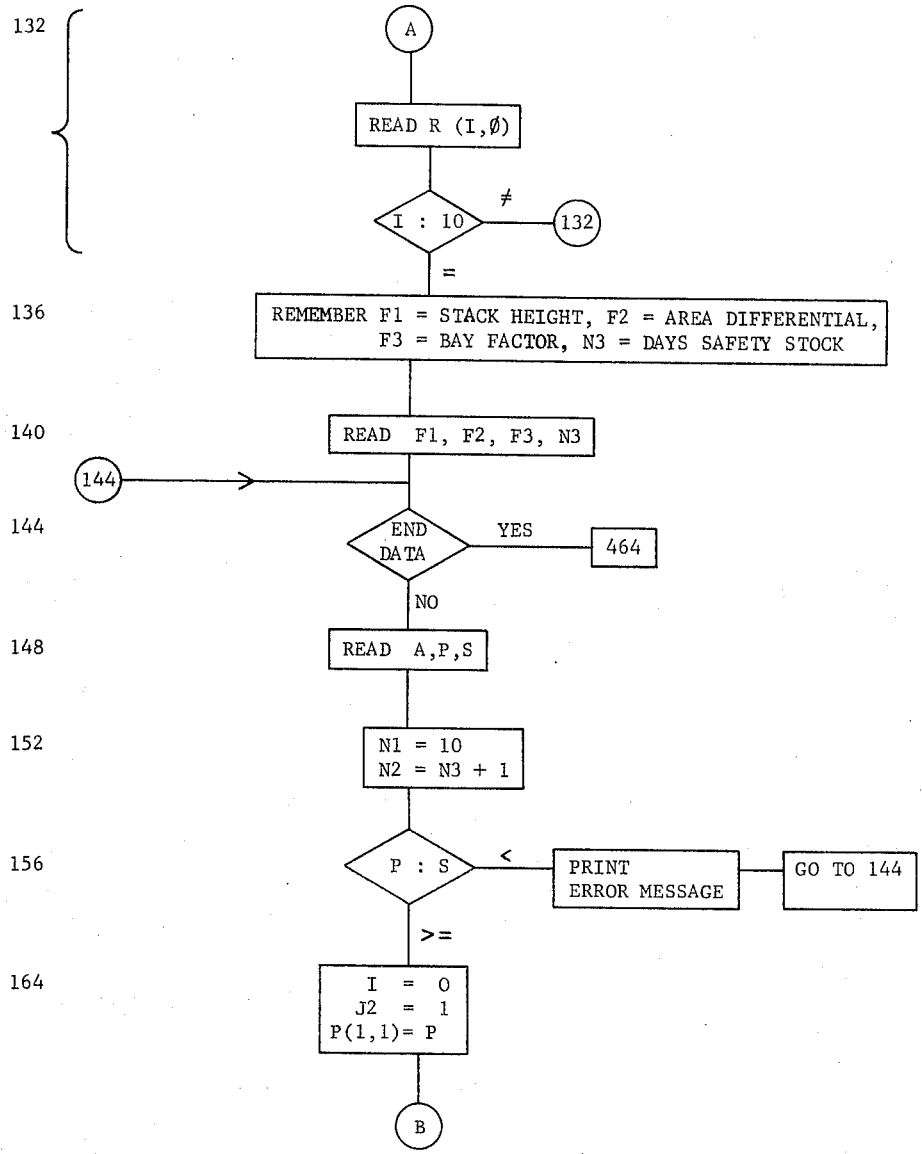
Figure 3C:
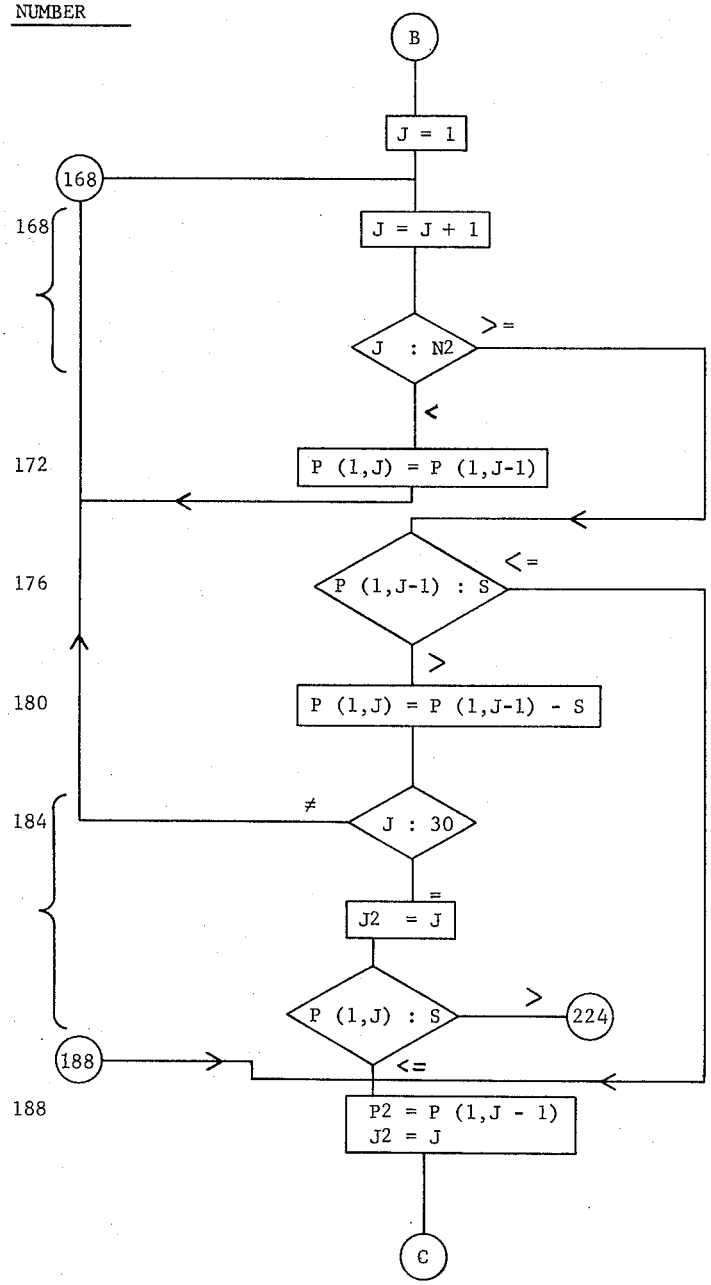
Figure 3D:
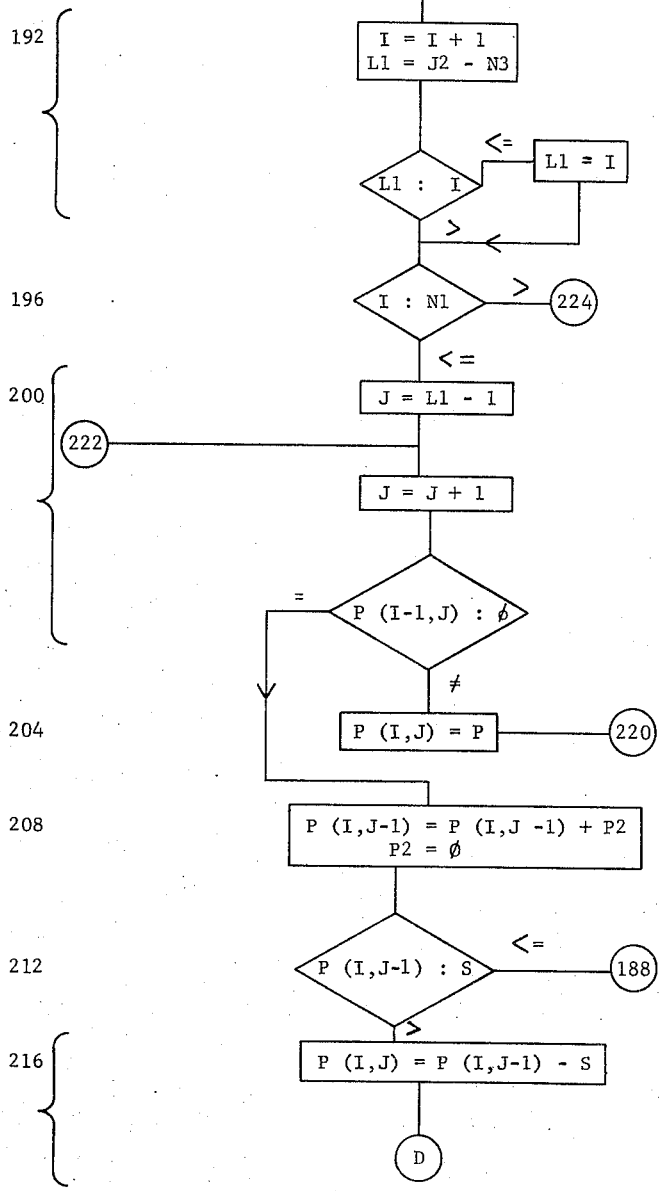
Figure 3E:
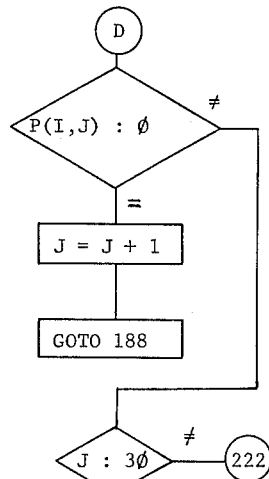
Figure 3G:
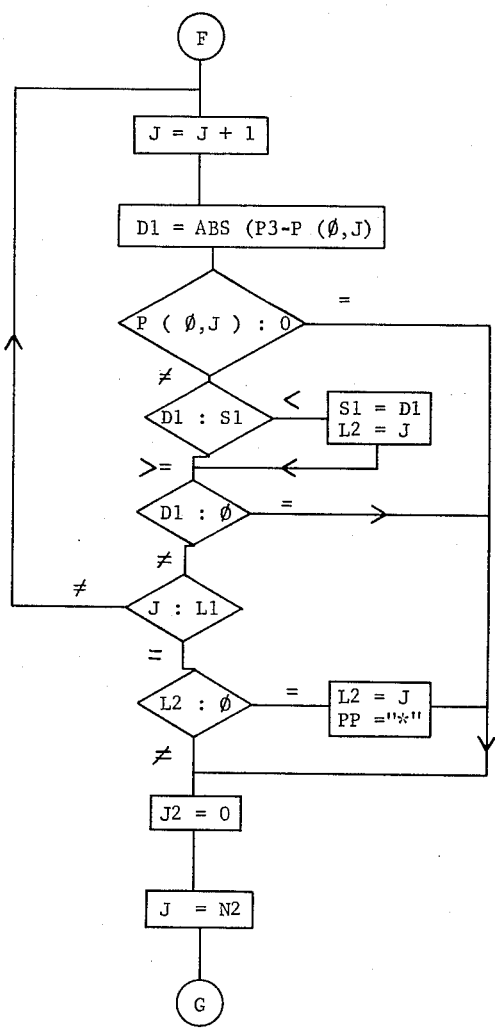
Figure 3H:
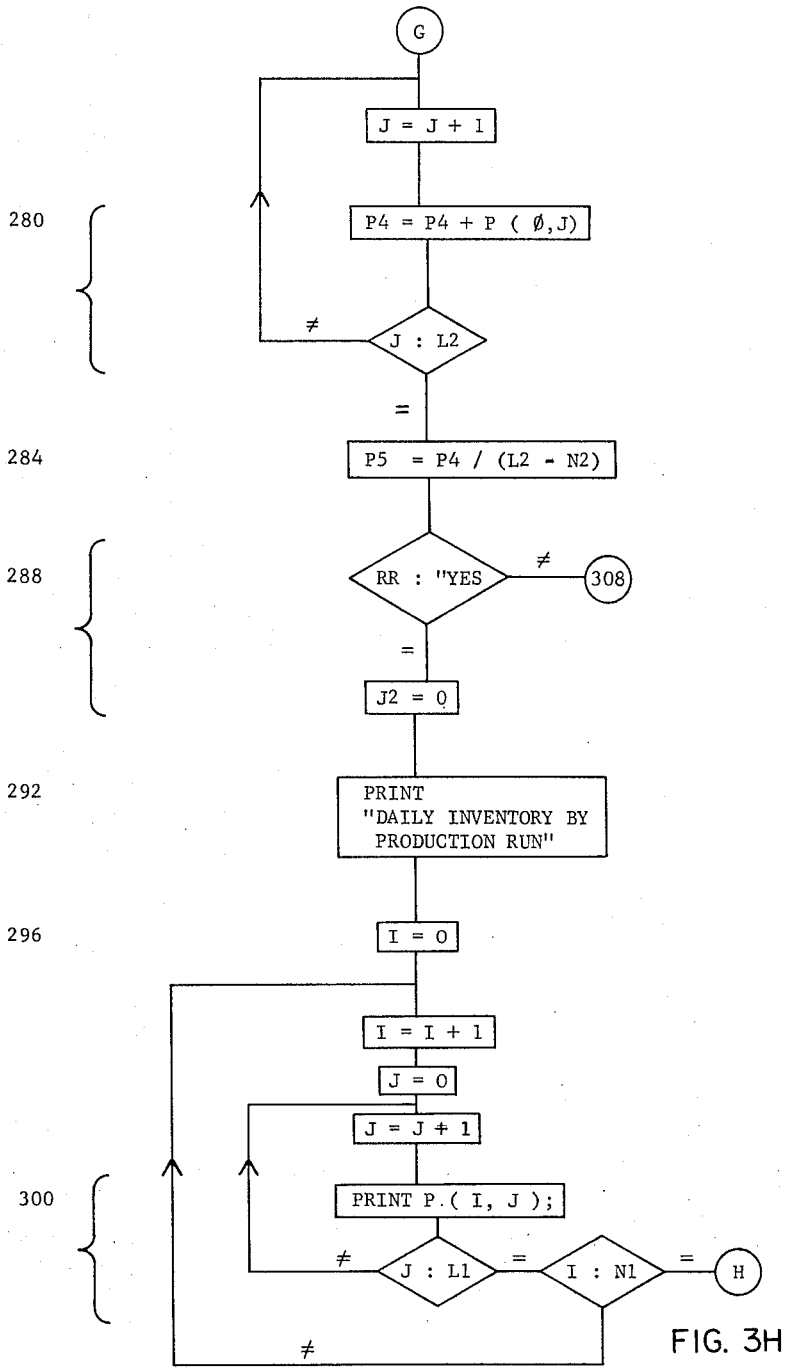
Figure 31:
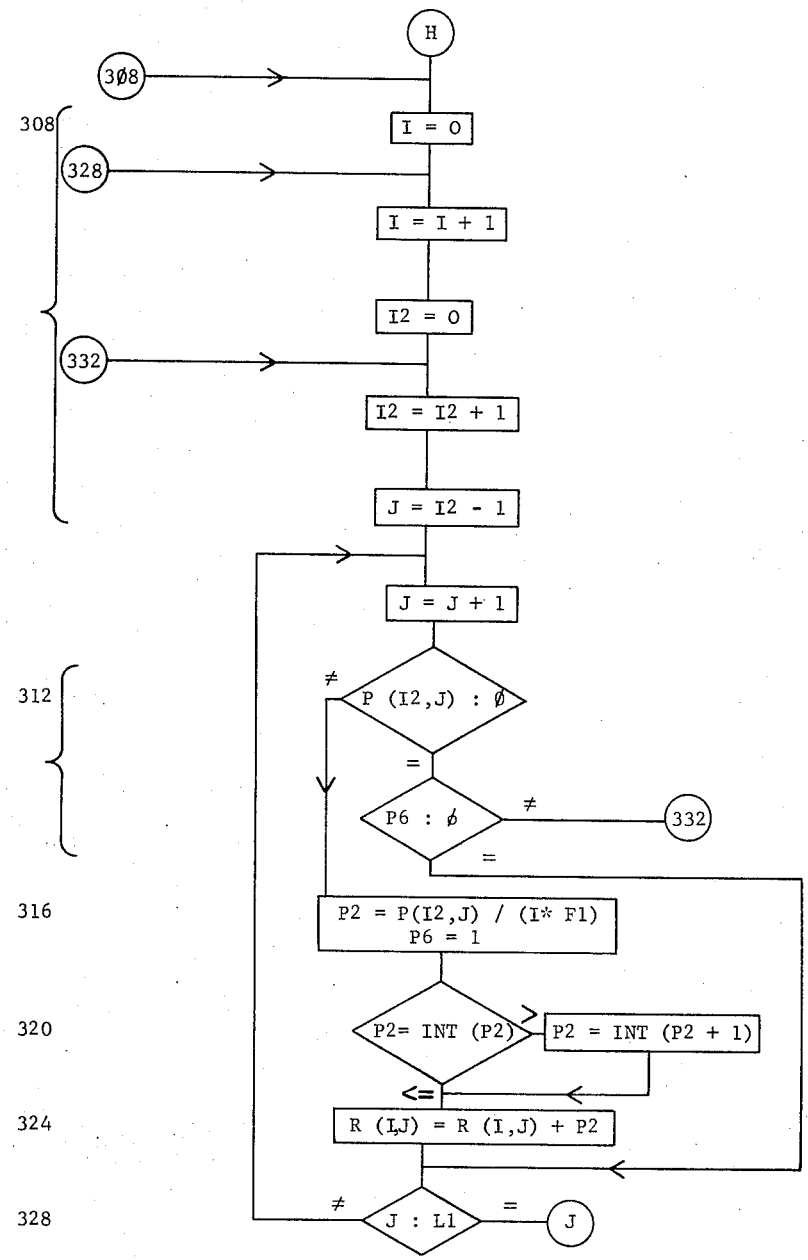
Figure 3J:
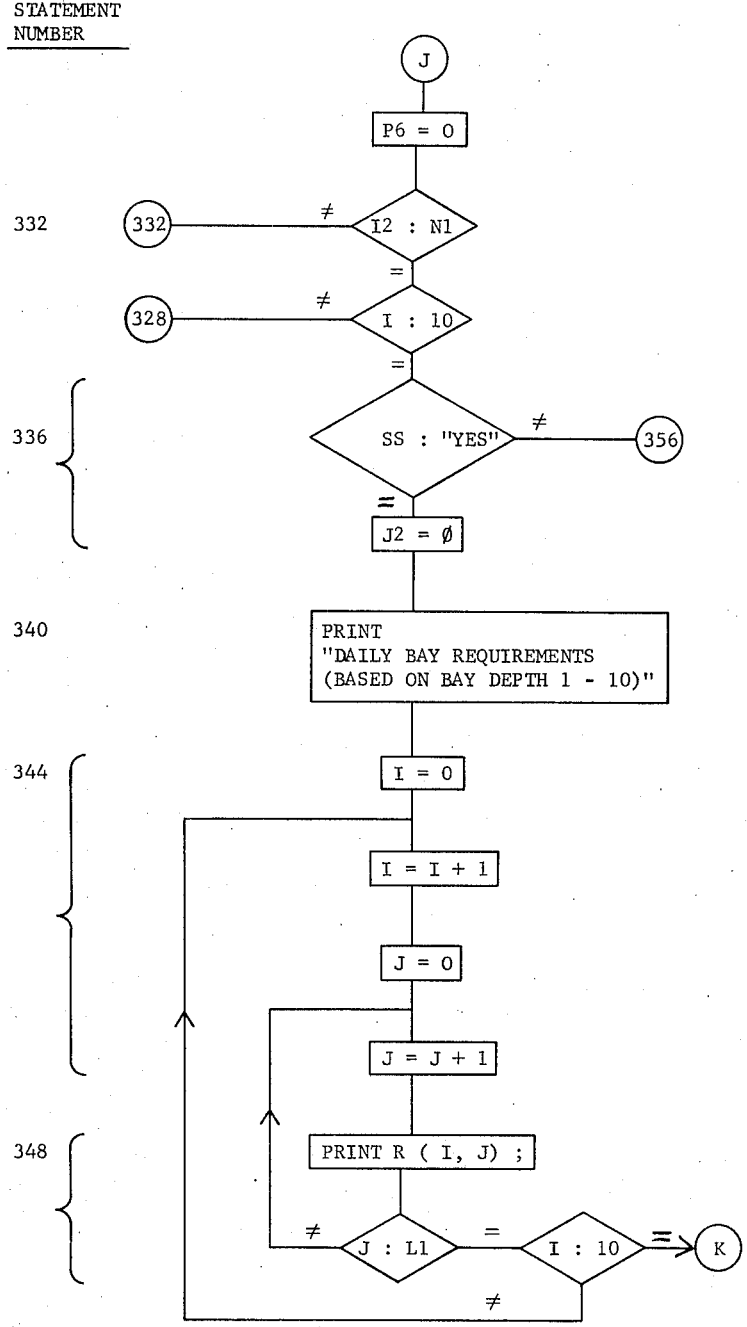
Figure 3K:
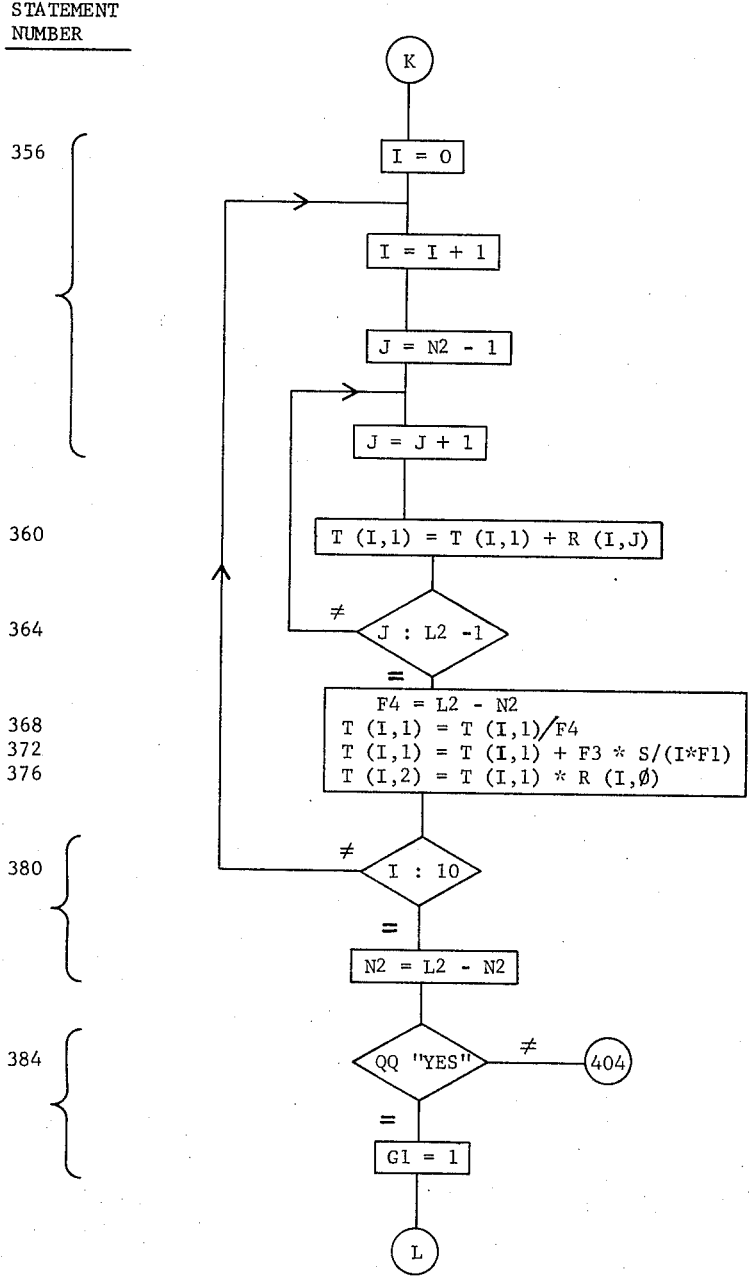
Figure 3L:
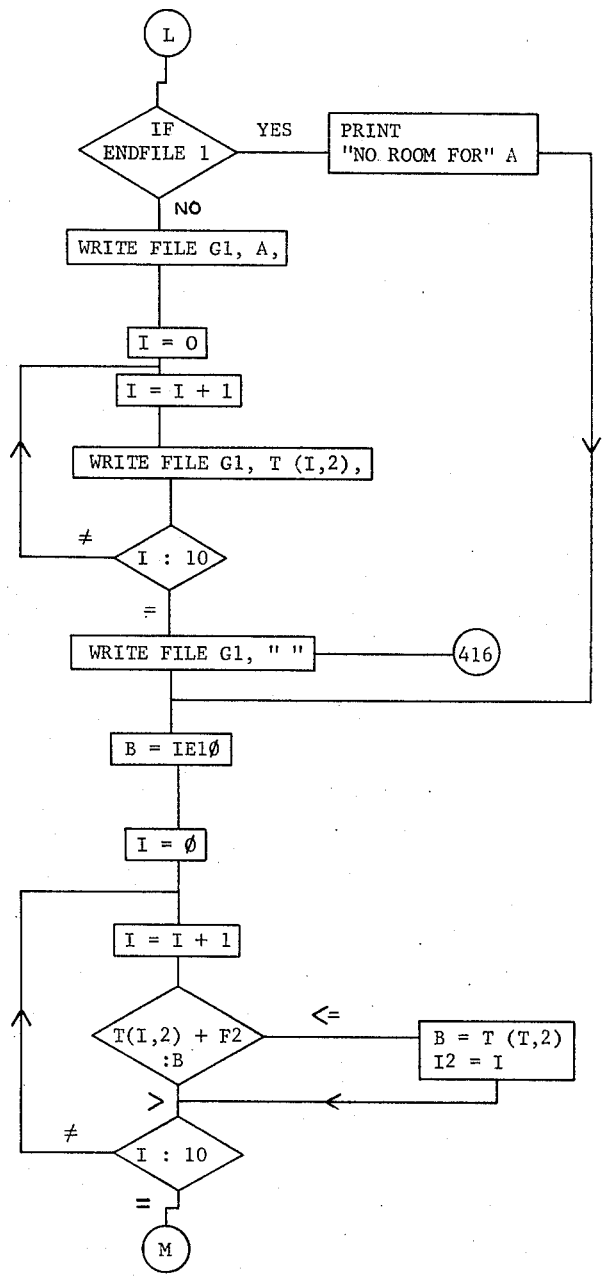
Figure 3N:
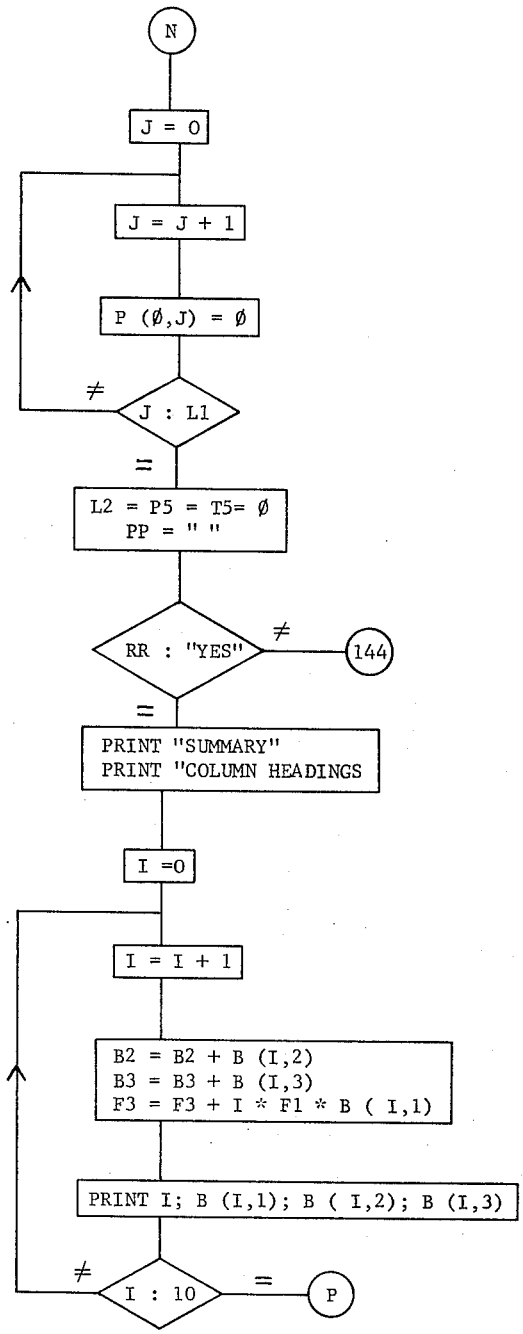

For purposes of illustration the invention will be described in connection with determining the optimum layout of bays for a warehouse shown in the figure and designated 10. The warehouse 10, as will be seen by reference to the figure, is composed of walls 12 (only two of which are shown), a floor 14 on which are marked bays 18 and 20 among others separated by aisles 21. Each segment of the warehouse is divided by an imaginary grid into squares or base positions having a width W and a depth S. Each of the base positions 23 of width W and depth S is at just the appropriate size to receive one pallet 22 with a small space between the rows of pallets. Like most pallets, the pallets 22 that are placed in the base positions 23 have small legs which allow a fork lift truck to approach them along a single axis. Thus, the bay designated 24 is a four-deep bay and the bay designated 18 is an eight-deep bay.

The bay area is defined as the total of the area of the base positions D × W plus ½ the aisle width, e.g., 25 in the case of bay 24. One important factor with respect to the quantity of products shipped to a given bay (receiving quantity) is the capacity of the bay. The capacity of the bay should be equal to or slightly more than the receiving quantity or a multiple of the stacking height of that bay. Therefore, the most likely candidates for optimum bay size for a receiving quantity of say 30 pallets are a 10-deep bay (10 × 3 = 30) and a five-deep (5 × 3 × 2 = 30). Now, a second factor comes into play; the daily usage or shipping-out rate. At the lower shipping rates, a five-deep bay performs best. As the daily shipping rate increases, the advantage of a five-deep bay decreases and a 10-deep bay becomes more suitable.

A third factor to consider is the amount of safety stock carried. The term "safety stock period" is defined as the number of days or other time periods for which stock is planned to be on hand when the stock is replenished, i.e., the planned minimum inventory in time. It will be apparent that stock cannot be shipped out until the product has been in storage for the safety stock period. In general, the greater the safety stock requirement the more advantageous the larger bay sizes become. Thus with the pallet usage of about five pallets per day with a safety stock of 10 days, the area required is about 550 square feet. The advantage of the deeper bay increases with greater safety stock requirements. However, with the same daily usage and a requirement for only a three-day safety stock, only 300 square feet of bay area is required.

The following items are given in the computer program in accordance with the present invention: (a) the size of the production runs or receiving quantities which usually vary greatly from product to product, (b) the rate of shipping (shipping out) which also varies greatly from product to product, (c) the safety stock period required which in turn depends on the company deletion policy, the amount of day-to-day variation in orders received and ability to forecase shipping requirements, (d) the stacking height of the various products, (e) the width of the aisles, (g) the number of products to be stored, (h) the size of each storage area (base size) and (i) the assumed bay depth for the run.

From this information, the program will compute the warehouse storage requirements in terms of unit loads or pallets to be stored and the area required to store the pallets for the particular set of operating conditions. In addition, it will determine the optimum bay size for each product and the optimum assortment of bay sizes for different products to obtain the maximum utilization of the warehouse for a given set of operating conditions.

The invention is based in part upon the recognition that the inventory under the shipping conditions encountered will undergo a repetitive cycle over a period of time in which the number of units in inventory returns periodically to its original value or close to its original value and that the length of this cycle can be used to optimize storage.

To determine the number of days in an inventory cycle (F4): Definitions:

$D1$ = Absolute difference in inventory from 1st day of shipment and a successive day
$N2$ = First day product can be shipped out
$N3$ = Number of days of safety stock
$L1$ = Upper limit of days in inventory (arbitrary e.g., 30 days)
$L2$ = Day minimum absolute difference occurs
$P\phi_J$ = Total inventory on day J
$P3$ = Total inventory on day $N2 = P\phi_{N2}$
$S = S1$ = Shipping out quantity Procedure:

$D1 = ABS(P3 - P\phi_J)$ for $J = N2 + 1$ to $L1$ : if $D1 > S1$ continue, otherwise $L2 = J$ day minimum difference occurred $F4 = L2 - N2$ = Days in one inventory cycle The determination of area and optimum bay size is described in the following equations wherein:

$R_{ij}$ = Number of bays in use at the end of any given day for a particular bay depth (I).
$C_i$ = Bay capacity in pallets = bay depth (I) times stack height ($F_1$)
$F4$ = Days in cycle
$S$ = Daily shipping quantity
$P$ = Number of pallets produced or received
$F3$ = Factor related to rate of bay depletion (percent of day a bay is available for refilling on the day a bay is emptied)
$M$ = Bay factor addition ($F3 \times F4 \times S/C_i$)
$T_{i,1}$ = Average number of bays used per day for the cycle for a particular bay depth
$R_{i,0}$ = Area in square feet assigned to a bay of a given depth
$T_{i,2}$ = Average area required for the cycle for a particular bay depth Since, $$T_{i,2} = T_{i,1} \times R_{i,0}$$

then $$T_{i,2} = \left( \frac{\sum_{j=(N3+1)}^{j=(N3+F4+1)} R_{i,j} + M}{F4} \right) \times R_{i,0}$$

and substituting $$T_{i,2}=\left(\frac{\sum\limits_{j=(N3+1)}^{j=(N3+1+F4)} R_{i,j}+\left(\frac{F4\times S}{C_i}\right)\times F3}{F4}\right)\times R_{i,0}$$

The minimum floor area is selected from the $T_{i,2}$ determined assuming a number of different bay depths.

The calculation of percent bay utilization for the optimum bay depth is carried out as follows where:
- P5 = Summation of the average inventory associated with a given bay depth for the length of the cycle
- $P_j$ = End of day inventory
- j = Calendar days
- F4 = Cycle length
- T5 = Percent utilization of optimum bay depth
- E = Average number of bays used per day of the cycle
- C = Bay capacity in pallets = bay depth times stacking height
- $T_{i2,2}$ = Area of the optimum bay $$P5=\frac{\sum\limits_{j=N3}^{j=(N3+F4)} P_j}{F4}$$

then $$T5=(100\times P5/T_{i,2,2}\times C_i)$$

In selecting information to provide the constants noted above, shipping activity should be observed for at least a month and it should be noted whether past history indicates volume is increasing or decreasing. In addition, production can be forecast to estimate constants. Each individual product is run separately through the program.

As mentioned above, the total bay area required includes the area of the bay itself plus 1/2 of the aisle immediately adjacent to it. To the results obtained using the program of the invention, certain remaining areas in the warehouse not used for storage must be added by the operator to find the total required storage area. The most important of these are: (1) shipping and receiving dock areas, (2) order and assembly areas, (3) sanitation clearances along walls, (4) the area of cross aisles without storage adjacent to them, and (5) equipment obstruction areas.

Reference will not be made to FIG. 2 of the drawings describing one preferred form of data processing system embodying the present invention. As seen in FIG. 2, a teletype unit 50 is connected to communicate through a channel 52 to an automatic switchboard 54 having a plurality of communication channels 56 that are connected to other teletype units (not shown). The automatic switchboard 54 in turn communicates through a channel 58 to a data processing system including a master computer section 60 which is provided with logic circuitry for establishing priorities and handling communication, i.e., reading and writing data composed of a bit stream representing the characteristics of warehouse storage conditions as described herein. The master computer section 60 in turn connected to a disk memory 62 through a communication channel 64 and to a slave computer 66 which contains logic circuitry for performing mathematical calculations. The slave computer 66 is in turn connected to the disk storage memory 62 via channel 70. All of the channels herein are two-way communication channels. The program embodying the present invention is contained in the disk storage memory 62. The data processing system composed of units 60, 62 and 66 contains logic circuitry of a suitable known construction for adding, subtracting, comparing, multiplying, dividing and performing the other operations called for by the program in the disk storage memory 62 as will be described in detail hereinbelow.

An example of the program is written in extended basic which can be used on a digital computer such as a General Electric 265.

An English language summary of the program is presented in Table I. The numbers on the left correspond with line numbers of a complete example of the program presented below in Table II, and in FIGS. 3A–3O. The schematic diagram of FIGS. 3A–3O can be understood by reference to the description presented in Table I and to the definition of terms presented following Table I.

TABLE 1

| Line Number | Operation |
| --- | --- |
| 100 | Define file (storage location) to be used for calculating data |
| 104 | Dimension arrays for variables (either calculated or values used in program) |
| 104 – 116 | Determine calculation options |
| 128 | Print title and column headings Read area of each bay depth |
| 136 – 140 | Read stack height, minimum area differential necessary to be treated as an important, bay factor, i.e., a percentage of the day that a bay is available for storage on the day it becomes empty, e.g., 50%, days safety stock |
| 144 – 148 | Read product code, production and shipping quantity |
| 152 | Set maximum number of production runs to be considered, e.g., 10 runs; set 1st day of shipment |
| 156 – 160 | Error check to determine if production is less than shipping |
| 164 – 236 | Establish daily pallet inventories based on production and shipping quantities for a maximum of 30 days; isolate production runs from one another so that storage is in separate bays |
| 240 – 248 | Compute total daily inventory |
| 252 – 284 | Establish number of days in activity cycle. Calculate average daily inventory |
| 288 – 304 | Print option for daily inventory profile |
| 308 – 332 | Determine daily bay requirements based on integer pallets and 1-10 bay depth constraint |
| 336 – 352 | Print option for daily bay requirements |
| 356 – 380 | Calculate average inventory and area requirement for each bay depth (1-10) |
| 384 – 400 | Write area requirements by bay depth in file if desired |
| 416 – 428 | Calculate minimum area required; calculate pallet utilization |
| 432 – 444 | Print product code, quantity produced and shipped, days in cycle, average daily pallet inventory, pallet utilization, depth and number of bays, and area needed |
| 448 | Summation of bays and area for summary |

| | |
|---|---|
| 452 – 460 | Zero arrays and constants; return for more data |
| 468 – 496 | Print summary information; bays required, total area; average inventory |
| 500 – 516 | Title and column heating; print routine |
| 698 | Bay area requirement data |
| 699 | Variable data |

Before a typical program embodying the invention is presented by way of example, a brief description of the terms to be computed and the terms employed in the program will be defined.

Rather than providing answers in the number of cases or boxes of each product, the program begins simply with the pallet base area or base size. For example, a typical pallet measures 48 inches on a side. This results in a base size of about 22 square feet to provide for clearances plus 30 square feet for half an aisle or 52 square feet. For a two-deep bay, the total base position area is 2 × 22 plus 30 or 74 square feet. Thus, the term base position means a floor area of the desired size to accommodate one unit of product.

The term "bay depth" means the number of pallets in a single row lying from front to the rear of the bay. The term "pallet" refers to a horizontal platform device used as a base for storing products. The "base position" means the area on the floor required for one pallet or unit load.

DEFINITION OF TERMS

DIMENSIONED ARRAYS

| | |
|---|---|
| B(10,3) | The rows (10 refer to bay depths (1 to 10). The columns (3) refer to attributes of each bay depth. |
| | Column 1 - number of each bay depth required |
| | Column 2 - total area associated with each bay depth |
| | Column 3 - summation of inventory (in pallet or unit loads) associated with each bay depth |
| (10,30) | The rows (10) refer to production runs. The columns (30) refer to calendar days. Values stored are end of day inventories in pallets or units |
| R(10,30) | The rows (10) refer to bay depth. The columns (30) refer to calendar days. Values stored are the number of bays in use at end of each day. |
| R(10,0) | Column zero (0) contains area associated with each bay depth (1-10). |
| T(10,2) | The rows (10) refer to bay depth. The columns (2) refer to attributes of each bay depth. |
| | Column 1 - average number of bays used each day of the cycle |
| | Column 2 - area required to store inventory in each bay depth |
| B | Comparative value |

VARIABLE NAMES

| | |
|---|---|
| A | Product identification code |
| B2 | Total summation of area for all bay depths |
| B3 | Total summation of average inventory for all bay depths |
| B4 | Ratio of total inventory to calculated bay capacity required |
| D1 | Absolute difference of inventory on first day of shipping and inventory on successive days |
| F1 | Stack height in pallets or units |
| F2 | Bay depth area differential required to select deeper bay |
| F3 | Factor related to rate of bay depletion |
| F4 | Days in cycle to compute the average inventory |
| F5 | Calculated capacity of all bays |
| G1 | File designator |
| I | Row subscript associated with arrays |
| I2 | Alternate row subscript |
| J | Column subscript |
| J2 | Day last product is shipped from each production run |
| L1 | Earliest day production can start based on safety stock Redefined (line 240) as maximum limit of calendar days to be used in computations |
| L2 | Day minimum difference occurs |
| N1 | Number of production runs (maximum 10) |
| N2 | First day product can be shipped based on safety stock |
| N3 | Days of safety stock |
| P | Number of pallets produced or received each production run |
| P2 | That amount of a production run less than shipping quantity that is added to succeeding production run. Redefined as integer bay requirement to store inventory |
| P3 | Inventory on first day of shipment |
| P4 | Summation of daily inventory in the cycle |
| P5 | Average inventory for the period of the cycle |
| P6 | Control variable |
| S | Daily shipping quantity |
| S1 | Replication of S for program efficiency |
| T5 | Utilization of optimum bay depth |

Having now fully defined the terms employed in the program, an example of the program will now be presented in Table II below.

TABLE II

```
WAREHOUSE   ALLOCATION   PROGRAM

100  FILE SPACE

104  DIM B(10,3),P(10,30),R(10,30),T(10,2)

108  PRINT"DO YOU WANT FILE OF BAY REQUIREMENTS": \ INPUT QQ

112  PRINT TAB(19);"DAILY INVENTORIES"; \ INPUT RR

116  PRINT TAB(14);"DAILY BAY REQUIREMENTS": \ INPUT SS

120  PRINT \ PRINT \ PRINT
```

Table II—Continued

WAREHOUSE ALLOCATION PROGRAM

```
124 SET I=2,S \ SET N=7,S \ SET P=S=6.1,S \ SET R=7,S

128 IF RR="YES" THEN 132 \ GOSUB 500

132 FOR I=1 TO 10 \ READ R(I,0) \ NEXT I

136 REM F1=STACK HGT F2=SQAREA DIFFRL F3=BAY FACTOR  N3=SFTY STK

140 READ F1,F2,F3,N3

144 IF END DATA THEN 464

148 READ A,P,S

152 N1=10 \ N2=N3+1

156 IF P>=S THEN 164 \ PRINT" PRODUCT CODE ";A;" PRODUCTION LESS":

160 PRINT" THAN SHIPPING QUANTITY" \ PRINT \ GOTO 144

164 I=1 \ J2=0 \ P(1,1)=P

168 FOR J=2 TO 30 \ IF J>=N2 THEN 176

172 P(1,J)=P(1,J-1) \ GOTO 184

176 IF P(1,J-1)<=S THEN 188

180 P(1,J)=P(1,J-1)-S

184 NEXT J \ J2=J \ IF P(1,J)>S THEN 224

188 P2=P(1,J-1) \ J2=J

192 I=I+1 \ L1=J2-N3 \ IF L1>=I THEN 196 \ L1=I

196 IF I>N1 THEN 224

200 FOR J=L1 TO 30 \ IF P(I-1,J)=0 THEN 208

204 P(I,J)=P \ GOTO 220

208 P(I,J-1)=P(I,J-1)+P2 \ P2=0

212 IF P(I,J-1)<=S THEN 188

216 P(I,J)=P(I,J-1)-S \ IF P(I,J)<>0 THEN 220 \ J=J+1 \ GOTO 188

220 NEXT J \ N1=I

224 FOR I=1 TO N1 \ FOR J=I+1 TO 30 \ IF P(I,J)=0 THEN 232

228 IF P(I,J)<=P THEN 232 \ P(I,J)=P

232 NEXT J

236 NEXT I

240 L1=10*INT(J2/10+1) \ IF L1<=30 THEN 244 \ L1=30

244 FOR I=1 TO N1 \ FOR J=1 TO L1 \ P(0,J)=P(0,J)+P(I,J)

248 NEXT J \ NEXT I
```

Table II—Continued

WAREHOUSE ALLOCATION PROGRAM

```
252 P3=P(0,N2) \ S1=S

256 FOR J=N2+1 TO L1

260 D1=ABS(P3-P(0,J))

264 IF P(0,J)=0 THEN 280

268 IF D1>=S1 THEN 276 \ S1=D1 \ L2=J

272 IF D1=0 THEN 280

276 NEXT J \ IF L2<>0 THEN 280 \ L2=J \ PP="*"

280 J2=0 \ FOR J=N2+1 TO L2 \ P4=P4+P(0,J) \ NEXT J

284 P5=P4/(L2-N2)

288 IF RR<>"YES" THEN 308 \ J2=0

292 PRINT"DAILY INVENTORY BY PRODUCTION RUN" \ PRINT

296 SET P=5.1,S \ FOR I=1 TO N1 \ FOR J=1 TO L1

300 PRINT P(I,J); \ NEXT J \ PRINT \ PRINT \ NEXT I \ SET P=4.1,S

304 PRINT \ PRINT \ PRINT

308 FOR I=1 TO 10 \ FOR I2=1 TO N1 \ FOR J=I2 TO L1

312 IF P(I2,J)<>0 THEN 316 \ IF P6=0 THEN 328 \ GOTO 332

316 P2=P(I2,J)/(I*F1) \ P6=1

320 IF P2<=INT(P2) THEN 324 \ P2=INT(P2+1)

324 R(I,J)=R(I,J)+P2

328 NEXT J

332 P6=0 \ NEXT I2 \ NEXT I

336 IF SS<>"YES" THEN 356 \ J2=0

340 PRINT"DAILY BAY REQUIREMENTS (BASED ON BAY DEPTH 1-10)" \ PRINT

344 FOR I=1 TO 10 \ FOR J=1 TO L1

348 PRINT R(I,J); \ NEXT J \ PRINT \ PRINT \ NEXT I

352 PRINT \ PRINT \ PRINT

356 FOR I=1 TO 10 \ FOR J=N2 TO L2-1

360 T(I,1)=T(I,1)+R(I,J)

364 NEXT J \ F4=L2-N2

368 T(I,1)=T(I,1)/F4

372 T(I,1)=T(I,1)+F3*S/(I*F1)

376 T(I,2)=T(I,1)*R(I,0)
```

WAREHOUSE ALLOCATION PROGRAM

```
380 NEXT I \ N2=L2-N2

384 IF QQ<>"YES" THEN 404 \ G1=1

388 IF ENDFILE G1, THEN 392 \ GOTO 396

392 PRINT"NO ROOM IN FILE FOR ";A \ GOTO 416

396 SET T=4,S \ WRITE FILE G1,A,

400 FOR I=1 TO 10 \ WRITE FILE G1,T(I,2), \ NEXT I \ WRITE FILE G1," "

404 GOTO 416

408 SET T=10.2,S \ FOR I=1 TO 10 \ FOR J=1 TO 2 \ PRINT T(I,J);

412 NEXT J \ PRINT \ NEXT I \ PRINT

416 B=1E10 \ FOR I=1 TO 10

420 IF T(I,2)+F2>B THEN 428

424 B=T(I,2) \ I2=I

428 NEXT I \B(I2,3)=B(I2,3)+P5 \ T5=100.*P5/(F1*I2*T(I2,1))

432 SET T=4.2,S

436 IF RR<>"YES" THEN 440 \ GOSUB 500 \ PRINT

440 PRINT A;TAB(7);P;S;N2;PP;TAB(32);P5;TAB(43);T5;TAB(51);T(I2,1);

444 PRINT"-";I2;TAB(64);T(I2,2)

448 FOR J=1 TO 2 \ B(I2,J)=B(I2,J)+T(I2,J) \ NEXT J

452 MAT P=ZER \ MAT R=ZER \ MAT T=ZER

456 FOR J=1 TO L1 \ P(0,J)=0 \ NEXT J

460 L2=P4=P5=T5=0 \ PP=" " \ IF RR="YES" THEN 464 \ GOTO 144

464 PRINT \ PRINT \ PRINT \ SET B=9.2,S \ B2=B3=F5=0

468 PRINT" SUMMARY:" \ PRINT \ PRINT

472 PRINT"    BAY  DEPTH  REQUIRED  TOTAL AREA  AV INVENTORY" \ PRINT

476 FOR I=1 TO 10 \ B2=B2+B(I,2) \ B3=B3+B(I,3) \ F5=F5+I*F1*B(I,1)

480 PRINT TAB(9);I;B(I,1);B(I,2);B(I,3)

484 NEXT I

488 PRINT \ PRINT TAB(23);B2;B3

492 PRINT \ PRINT \ PRINT \ PRINT"PERCENT ULTILIZATION:";

496 B4=100.*B3/F5 \ PRINT TAB(23);B4

498 STOP

500 PRINT TAB(15);"W A R E H O U S E    A L L O C A T I O N" \ PRINT
```

Table II – Continued

```
WAREHOUSE   ALLOCATION   PROGRAM

504 PRINT"PRODUCT";TAB(27);"DAYS  AV PALLET  PERCENT   MIN STOR";

508 PRINT TAB(65);"AREA" \ PRINT" CODE    PRODUCE SHIPPED   ";

512 PRINT" CYCLE INVENTORY  UTLIZATN  BAYS DEEP" \ PRINT

516 RETURN

698 DATA 43,60,77,94,111,128,145,162,179,196

699 DATA 3,0,0.5,3

700 DATA 1000,35,10
```

EXAMPLE I

The operation of the program will now be described with reference to Table III which illustrates a sample calculation of the bay requirements for a particular product for which 35 pallets are produced each production run, 10 pallets are shipped out each day, the safety stock is 3 days and the pallets are stacked three high. The bay will be assumed to be six pallets deep for the run illustrated in Table III.

1. The input quantity for the product is recorded for each successive day, beginning with day 1 out to a total of 30 days of which only 13 are shown in the table. Since the product is stored three-deep in a six-deep bay, there will be a maximum of 18 pallets in storage in each bay, the overflow going to the next bay. Since the safety stock is 3 days, no product can be removed from a bay until it has been there for 3 days. Additionally, as mentioned above, the first product in must be the first product removed.

2. Subtract the quantity shipped out each day without subtracting any until the number of days elapses which equals the safety stock period.

3. Continue adding and removing products from storage for each day on a continuous basis to find the number of units in storage each day.

4. Compare the number in storage each day with the quantity in storage on the first day of shipment out until a sum is found which has a minimum difference from the first sum. Thus, the difference between the second sum and 60, the quantity in storage on the first day the product is shipped out, is 10 and the difference between the third sum (40) and 60 is 20. Finally, after 7 days of introducing and removing the product, there is zero difference between the initial sum, 60, and the total on that day. In performing this operation, the difference between the total on each successive day and the first day's total is computed.

5. The minimum difference figure calculated as described above is kept in storage until the program has continued through a series of 30 days unless a difference of zero is found as on day 11 in Table III, at which time the totaling of pallets in storage is terminated and the cycle (7 days in this case) is recorded. The day upon which the minimum difference occurred that is also less than the shipping quantity is regarded as the last day of a cycle in the event a minimum difference of zero is never reached.

6. Next, the average number of bays in use each day is found during the cycle (counting a half bay for each zero, the total is 25 divided by 7 or 3.56, the average number of bays in use each day.)

7. The average number of bays in use is multiplied by the area for one six-deep bay (128 sq. ft.) to arrive at the total floor area required when six-deep bays are used (456 sq. ft.).

8. All of the above steps are then repeated for each bay size that is to be tested, e.g. from 1 to 10 deep. The total floor area required for each bay size is computed. The program then selects as the optimum bay size viz. the bay size that results in a minimum floor area requirement.

The invention will be better understood by reference to the following working example utilizing the program of Table III.

TABLE III.—SAMPLE CALCULATION OF BAY REQUIREMENT

Produce 35 pallets each run, Ship 10 pallets each day

Safety stock—3 days, Stack 3 pallets high, Store in a 6-deep bay

| Run No. | Bay | Day 1 | | | Day 2 | | | Day 3 | | | Day 4 | | | Day 5 | | | Day 6 | | |
|---|---|---|---|---|---|---|---|---|---|---|---|---|---|---|---|---|---|---|---|
| | | In | Out | Bal. | In | Out | Bal. | In | Out | Bal. | In | Out | Bal. | In | Out | Bal. | In | Out | Bal. |
| 1 | 1 | 17 | 0 | 17 | 0 | 0 | 17 | 0 | 0 | 17 | 0 | 10 | 7 | 0 | 7 | 0 | | | |
| | 2 | 18 | 0 | 18 | 0 | 0 | 18 | 0 | 0 | 18 | 0 | 0 | 18 | 0 | 3 | 15 | 0 | 10 | 5 |
| 2 | 3 | | | | | | | | | | 17 | 0 | 17 | 0 | 0 | 17 | 0 | 0 | 17 |
| | 4 | | | | | | | | | | 18 | 0 | 18 | 0 | 0 | 18 | 0 | 0 | 18 |
| 3 | 5 | | | | | | | | | | | | | | | | | | |
| | 6 | | | | | | | | | | | | | | | | | | |
| 4 | 7 | | | | | | | | | | | | | | | | | | |
| | 8 | | | | | | | | | | | | | | | | | | |
| Number of pallets | | | | | | | | | | | Total 60 | | | Total 50 | | | Total 40 | | |
| Number of 6 deep bays | | | | | | | | | | | 4 | | | 3.5 | | | 3 | | |

| Run No. | Bay | Day 7 | | | Day 8 | | | Day 9 | | | Day 10 | | | Day 11 | | | Day 12 | | | Day 13 | | |
|---|---|---|---|---|---|---|---|---|---|---|---|---|---|---|---|---|---|---|---|---|---|---|
| | | In | Out | Bal. | In | Out | Bal. | In | Out | Bal. | In | Out | Bal. | In | Out | Bal. | In | Out | Bal. | In | Out | Bal. |
| 1 | 1 | | | | | | | | | | | | | | | | | | | | | |
| | 2 | 0 | 5 | 0 | | | | | | | | | | | | | | | | | | |
| 2 | 3 | 0 | 5 | 12 | 0 | 10 | 2 | 0 | 2 | 0 | | | | | | | | | | | | |
| | 4 | 0 | 0 | 18 | 0 | 0 | 18 | 0 | 8 | 10 | 0 | 10 | 0 | | | | | | | | | |
| 3 | 5 | 17 | 0 | 17 | 0 | 0 | 17 | 0 | 0 | 17 | 0 | 0 | 17 | 0 | 10 | 7 | 0 | 7 | 0 | | | |
| | 6 | 18 | 0 | 18 | 0 | 0 | 18 | 0 | 0 | 18 | 0 | 0 | 18 | 0 | 0 | 18 | 0 | 3 | 5 | 0 | 10 | 5 |
| 4 | 7 | | | | | | | | | | | | | 17 | 0 | 17 | 0 | 0 | 17 | 0 | 0 | 17 |
| | 8 | | | | (Cycle Length from Day 4 to Day 10) | | | | | | | | | 18 | 0 | 18 | 0 | 0 | 18 | 0 | 0 | 18 |
| Number of pallets | | Total 65 | | | Total 55 | | | Total 45 | | | Total 35=350 | | | 7=50 Pallets (Average) | | | | | | | | |
| Number of 6-deep bays | | 4.5 | | | 4 | | | 3.5 | | | 2.5=25.0 | | | 7=3.56 (Average bays) | | | | | | | | |

EXAMPLE II

To further illustrate a typical computer printout that results utilizing the program of the invention, there is presented below in Tables IV – VI the information generated for several products stored in a single warehouse.

TABLE IV.—WAREHOUSE ALLOCATION

| Product code | 1000 | 5200 | 5201 | 5202 | 5204 | 5285 | 8640 | 8641 | 8621 | 5241 | 5242 | 5245 | 5247 | 5250 |
|---|---|---|---|---|---|---|---|---|---|---|---|---|---|---|
| Pallets produced | 35.0 | 23.7 | 17.4 | 31.0 | 57.4 | 7.0 | 6.6 | 12.8 | 26.4 | 7.1 | 11.0 | 5.7 | 7.1 | 6.9 |
| Pallets shipped out | 10.0 | 7.0 | 3.2 | 9.9 | 32.6 | .5 | .5 | .9 | 1.8 | 1.1 | 1.3 | 1.4 | 2.7 | .5 |
| Days in cycle | 7 | 17 | 38 | 25 | 7 | 14 | 13 | 14 | 44 | 13 | 17 | 4 | 21 | 55 |
| Average pallet inventory | 50.0 | 50.00 | 18.2 | 44.9 | 124.0 | 5.3 | 4.6 | 8.8 | 18.9 | 7.0 | 9.6 | 6.5 | 11.6 | 4.9 |
| Percent utilization | 77.95 | 68.13 | 61.58 | 69.42 | 76.54 | 100.00 | 100.00 | 66.18 | 78.04 | 51.36 | 57.13 | 100.00 | 55.98 | 100.00 |
| Average number of bays used per day | 3.56 | 2.03 | 1.64 | 3.59 | 5.40 | 5.54 | 5.42 | 2.22 | 2.69 | 1.52 | 1.41 | 7.38 | 2.29 | 5.51 |
| Bay depth at minimum storage area | 6 | 8 | 6 | 6 | 10 | 0 | 0 | 2 | 3 | 3 | 4 | 0 | 3 | 0 |
| Minimum storage area | 456.13 | 328.57 | 210.11 | 460.16 | 1,058.49 | 83.31 | 81.62 | 133.07 | 207.20 | 117.24 | 132.27 | 110.99 | 176.55 | 82.91 |

TABLE V

SUMMARY OF THE WAREHOUSE DESCRIBED IN TABLE IV

| Bay Depth | Number of Bays - Required | Total Area | Average Inventory |
|---|---|---|---|
| 1 | .00 | .00 | .00 |
| 2 | 2.22 | 133.07 | 8.81 |
| 3 | 11.08 | 852.80 | 60.75 |
| 4 | 5.47 | 513.80 | 36.85 |
| 5 | 2.71 | 300.81 | 22.95 |
| 6 | 8.80 | 1126.40 | 113.11 |
| 7 | .00 | .00 | .00 |
| 8 | 2.03 | 328.57 | 33.16 |
| 9 | .00 | .00 | .00 |
| 10 | 5.40 | 1058.49 | 124.00 |
| Totals | | 5291.55 | 464.59 |

TABLE VI

Bay Profile Showing Area Required In Sq. Ft. If Product Is Stored In Pallet Or Bays 1 to 10 Deep

| Product Code Number | 1 | 2 | 3 | 4 | 5 | 6 | 7 | 8 | 9 | 10 |
|---|---|---|---|---|---|---|---|---|---|---|
| 1000 | 815 | 581 | 516 | 482 | 513 | 456 | 490 | 543 | 570 | 593 |
| 5200 | 551 | 399 | 379 | 337 | 378 | 409 | 442 | 329 | 360 | 392 |
| 5201 | 309 | 231 | 212 | 238 | 260 | 210 | 236 | 262 | 289 | 315 |
| 5202 | 766 | 578 | 511 | 479 | 529 | 460 | 504 | 539 | 577 | 613 |
| 5204 | 2095 | 1474 | 1316 | 1189 | 1135 | 1231 | 1107 | 1221 | 1284 | 1058 |
| 5285 | 105 | 97 | 96 | 116 | 137 | 157 | 178 | 198 | 219 | 240 |
| 8640 | 103 | 95 | 97 | 118 | 138 | 159 | 180 | 201 | 222 | 243 |
| 8641 | 160 | 133 | 136 | 138 | 138 | 159 | 179 | 200 | 220 | 241 |
| 8621 | 303 | 234 | 207 | 219 | 211 | 227 | 240 | 249 | 222 | 242 |

What is claimed is:

1. An automated method of determining the allocation of storage space for goods performed by a digital computer having data storage comprising:

a. receiving in said data storage signals representing: the input quantity of units of goods to be stored in each of a series of consecutive time periods, the area of selected bay depths, the safety stock period of the goods, the stacking height and the daily shipping quantity, b. recording the number of units of goods in storage each time period prior to the safety stock period, c. after the safety stock period, adding and subtracting the number of units introduced and removed each time period in accordance with the shipping requirements and input quantity for each time period, d. totaling the number of units in storage for each time period, e. recording the difference between the number of units stored each time period and the number in storage at the end of the safety stock period, f. maintaining a record of the time period at which the difference is a minimum or zero, g. multiplying the average number of bays after the safety stock period and before the time period determined in step (f) that are utilized per time period by the area of one bay to obtain the total floor area required, h. repeating aforesaid operations (b) to (g) for each bay depth that is to be examined, and i. selecting as the optimum bay depth that which corresponds with the minimum total floor area.

2. The method as set forth in claim 1 wherein the unit is the size of a shipping pallet, 3. The method of claim 1 wherein a running total is computed for a series of consecutive time periods and is terminated at the end of a predetermined number of time periods whether or not a zero difference is established between the number of units in storage in the first time period and a subsequent number in storage.

4. A data processing system for processing data including data representing (a) the number of units of goods received into storage per time period, (b) the number of units shipped out per time period, (c) the safety stock period, (d) the stacking height of the goods, (e) the size of the storage area (base size) for one unit of goods, and (f) an assumed bay depth, said data processing system comprising a memory, means for reading and writing signals during operation of the memory, a logic circuit means, and wherein a stored program directs said data processing system to perform the following operations:

a. recording the number of said units in storage during each time period prior to the safety stock period,
b. adding and subtracting the number of units introduced and removed in each time period after the elapse of the safety stock period to establish the number of units in storage at the end of each time period,
c. recording the difference between the number of units in storage at the end of each time period and the number in storage at the end of the safety stock period,
d. maintaining a record of the time period when the difference obtained is at a minimum or zero to thereby establish a working cycle,
e. multiplying the average number of bays utilized per time period within the cycle by the area of one bay to obtain the total floor area required,
f. repeating the aforesaid operations for each bay depth that is to be examined, and
g. selecting as the optimum bay depth that which corresponds with the minimum floor area.

5. The combination as set forth in claim 4 wherein the unit is the size of a shipping pallet.

6. The combination of claim 4 wherein a running total is computed for a series of consecutive time periods and is terminated at the end of a predetermined number of time periods whether or not a zero difference is established between the number of units in storage after the safety stock period and a subsequent number of units in storage.

7. An automated method of determining the allocation of storage space in a warehouse performed by a data processing system having a stored program, said method comprising:

a. receiving in said data processing system signals representing: the input quantity of units to be stored in each of a series of consecutive time periods, an assumed bay depth, the safety stock period, the stacking height and the shipping quantity for each time period,
b. recording the number of units in storage each time period prior to the safety stock period,
c. after the safety stock period, adding and subtracting the number of units introduced and removed in each time period in accordance with the shipping requirements and input quantity for each time period,
d. totaling the number of units in storage for each time period,
e. recording the difference between the number of units stored in each time period and the number in storage at the end of the safety stock period,
f. maintaining a record of the time period when the difference is first a minimum or zero to establish a working cycle,
g. multiplying the average number of bays utilized per time period within the cycle by the area of one bay of the assumed depth to obtain the total floor area required,
h. multiplying the average number of bays in use in the cycle by the number of pallets in storage in each bay of the assumed depth and height to obtain the average pallet inventory, and
i. multiplying the average number of bays used per day during the cycle by the capacity in units of a single bay of the assumed bay depth and dividing the result into the average pallet inventory to thereby obtain the percent utilization of the bay.

* * * * *